(12) United States Patent
Richardson et al.

(10) Patent No.: US 7,435,378 B2
(45) Date of Patent: Oct. 14, 2008

(54) METHOD AND APPARATUS FOR TREATING GOODS

(75) Inventors: Roy Richardson, Newark, DE (US); John Achzet, Elkton, MD (US); Robert Dickinson, Townsend, DE (US); James Rushing, Charleston, SC (US)

(73) Assignee: Royal Fumigation Inc., New Castle, DE (US)

( * ) Notice: Subject to any disclaimer, the term of this patent is extended or adjusted under 35 U.S.C. 154(b) by 712 days.

(21) Appl. No.: 09/871,774

(22) Filed: Jun. 1, 2001

(65) Prior Publication Data

US 2002/0182106 A1 Dec. 5, 2002

(51) Int. Cl.
- *A61L 9/00* (2006.01)
- *A61L 2/00* (2006.01)
- *B01J 19/00* (2006.01)
- *A62B 7/08* (2006.01)
- *A01M 13/00* (2006.01)
- *E06B 9/00* (2006.01)
- *E04F 10/00* (2006.01)
- *A47H 1/00* (2006.01)
- *E04H 15/54* (2006.01)
- *E04H 15/34* (2006.01)

(52) U.S. Cl. .............. 422/1; 422/294; 422/5; 422/28; 422/32; 422/33; 422/40; 422/123; 422/124; 422/256; 422/261; 422/292; 422/300; 422/305; 422/306; 43/124; 43/125; 43/126; 43/127; 160/19; 160/46; 160/84.01; 160/123; 160/181; 160/330; 160/353; 160/368.1; 160/381; 135/115; 135/121; 135/122; 135/905; 426/235; 426/236

(58) Field of Classification Search ......... 422/294, 422/5, 1, 28, 32–33, 40, 123–124, 256, 261, 422/292, 300, 305–306; 43/124–127; 160/19, 160/46, 84.01, 123, 181, 330, 353, 368.1, 160/381; 135/115, 121, 122, 905; 426/235–236
See application file for complete search history.

(56) References Cited

U.S. PATENT DOCUMENTS 1,518,434 A 12/1924 Klein .................. 43/126

(Continued)

FOREIGN PATENT DOCUMENTS

| JP | 02-072820 | * 3/1990 |
| WO | WO 00/62607 | 10/2000 |

OTHER PUBLICATIONS

James F. Thompson, et al, Commercial Cooling of Fruits, Vegetables, and Flowers, Publication 21567, University of California, Division of Agriculture & Nat. Resources.

*Primary Examiner*—Jill Warden
*Assistant Examiner*—Monzer R Chorbaji
(74) *Attorney, Agent, or Firm*—Robert A. McKinley, Esq.

(57) ABSTRACT

The present invention is directed to a method and apparatus for treating goods, such as, for example, fumigating and re-cooling perishable goods, such as fruit, using a tarp and floor seal. The apparatus encloses goods on a surface and includes a canopy that is substantially impermeable to flowable materials, such as gas, liquid, or a combination thereof; an upper perimeter for supporting an upper portion of the canopy; a lower perimeter for supporting a lower portion of the canopy, the lower perimeter to be placed in proximity to the surface; a support structure for supporting the upper perimeter and lower perimeters; and a gasket in communication with the lower perimeter, wherein the gasket is deformable to substantially seal the chamber by compressing the gasket against the surface. The apparatus may also include an intermediate support structure for providing support to the canopy and a conduit in communication with the chamber to supply cool air to the chamber.

9 Claims, 7 Drawing Sheets

U.S. PATENT DOCUMENTS

| | | | |
|---|---|---|---|
| 3,226,144 A * | 12/1965 | Lomaz | 292/113 |
| 3,682,225 A * | 8/1972 | Redden | 160/98 |
| 3,925,942 A * | 12/1975 | Hemmelsbach | 52/86 |
| 4,033,367 A * | 7/1977 | Johnston | 135/100 |
| 4,576,014 A | 3/1986 | Miller et al. | |
| 4,956,042 A * | 9/1990 | Hubert et al. | 156/344 |
| 5,277,031 A | 1/1994 | Miller et al. | |
| 5,614,463 A * | 3/1997 | Kawasaki et al. | 503/227 |
| 5,641,463 A * | 6/1997 | Langhart | 422/294 |
| 5,904,909 A | 5/1999 | Yates et al. | |
| 6,047,496 A | 4/2000 | Leitner et al. | 43/125 |
| 6,422,253 B1 | 7/2002 | Glynn et al. | 135/115 |
| 6,450,188 B1 * | 9/2002 | Langhart | 135/115 |
| 2001/0029695 A1 | 10/2001 | Schott et al. | |

\* cited by examiner

METHOD AND APPARATUS FOR TREATING GOODS

BACKGROUND OF THE INVENTION

1. Field of the Invention

The present invention relates to treating goods. More particularly, the present invention relates to a method and apparatus for fumigating goods, such as foods, live munitions, vehicles, and paper records, using a tarp and floor seal. The invention also relates to cooling goods, particularly for storage purposes or after fumigation or treatment. Even more particularly, the present invention concerns fumigation of fruit using methyl bromide gas in a sealed tarp enclosure.

2. Description of the Prior Art

Historically, it has been important to fumigate commodities that are imported into one country from another to kill pests that are not native to the receiving country and that therefore pose a threat to its agriculture. Until recently, fumigation was most often accomplished using methyl bromide gas. While many uses of methyl bromide have been curbed by environmental laws, quarantine fumigation of perishable agricultural products, especially fresh fruit, will continue into the future.

Fruits and produce are normally transported under refrigeration to slow the metabolic processes associated with ripening and decay. In particular, fruit must be warmed to about 40° F. for fumigation, since methyl bromide boils at 38.5° F. and must be used in the gaseous state to be effective.

Fumigation is accomplished by sealing the fruit or produce in an enclosure and filling the enclosure with methyl bromide at a sufficient concentration and temperature, and for a sufficient period of time, to kill the target pest. The fruit is then removed from the enclosure to a cold storage facility to slowly reduce the temperature of the fruit to around 32° F. This cooling process can take as few as two to three days to accomplish, or as many as seven days or more. The actual cooling time depends on the type of packaging material (wooden crates, corrugated cartons, plastic bins, etc.), the configuration of palletized product placed in the cooling chamber, the efficiency of the refrigeration system, target temperature, and other variables. It is known in the art that handling and moving the fruit inherently increases the risk of damage, such as bruising, which lowers the commercial value of the commodity.

One example of fumigating enclosures disclosed in the prior art is U.S. Pat. No. 5,641,463 to Langhart, incorporated by reference herein. Langhart discloses a fumigation tent that includes a suspended frame and tarp, with horizontal pipes surrounding the perimeter of the tarp for rolling up the tarp, and a water-filled hose for sealing the tarp to the floor. A number of fans are used to mix and distribute the methyl bromide gas around the inside of the enclosure. However, this method of sealing the tarp to the floor using water is not widely used, if at all used in the fumigation business, primarily since filling and emptying hoses is time-consuming, cumbersome, and not practical in climates where the water could freeze.

The most widely used method of sealing a tarp to the floor is to weight it down with "sand snakes," which are elongated bags or sleeves, usually comprised of a vinyl material, that are filled with sand and used to weight the tarp down onto the floor. The bags are typically three to four feet in length and filled with 40-50 lbs. of sand each. In a typical fumigation of 3,500 pallets of commodity, approximately 12 tons of sand must be moved from a storage location to seal the tarp. Then, the same 12 tons of sand must be returned to storage after the fumigation.

These prior art fumigation systems have significant disadvantages. The use of water hoses or sand snakes is often cumbersome, time-consuming and difficult; requiring a number of workers to properly position the weights to adequately seal the tarp to the floor and to prevent gas from escaping. Moreover, if these weighting devices are not properly positioned, or if the tarp is permitted to "bunch," the methyl bromide gas may escape through resulting openings, causing a safety hazard.

Also, as noted above, the fruit must be heated to at least 40° F. for the fumigation, and then re-cooled. This re-cooling process can take upwards of seven days in these prior art systems, due to the slow rate of thermal transfer between the circulated air and the crated fruit. During this period of elevated temperature, as described above, the product ripens and decays more rapidly than at the appropriate refrigerated storage temperature for the specific commodity in question. The faster the product is re-cooled, the higher the quality and value of the product.

Accordingly, a system is needed that will adequately seal the fumigating enclosure and permit re-cooling after fumigation in the same enclosure; thereby minimizing manual manipulation of the product. Such a system will greatly increase the efficiency of both the fumigation and re-cooling process of perishable products over prior art systems, and will enhance the quality and value of the product being treated by fumigation, or by cooling, or by both processes.

SUMMARY OF THE INVENTION

The present invention is directed to a method and apparatus for treating goods, such as fumigating quarantined goods and cooling goods such as fruit, particularly after fumigation or treatment. The apparatus forms a chamber enclosing the goods on a surface and includes a canopy that is substantially impermeable to flowable materials, such as gas, liquid, or a combination thereof; an upper perimeter for supporting an upper portion of the canopy; a lower perimeter for supporting a lower portion of the canopy; a support structure for supporting the upper perimeter and lower perimeter; and a gasket in communication with the lower perimeter, the gasket being deformable to substantially seal the chamber by compressing the gasket against the surface.

In use, the upper perimeter and lower perimeter are fixedly attached to a support structure via a perimeter support. The apparatus may be moveable with respect to the support structure. The lower perimeter may be raised and compressed against the upper perimeter to provide room to place the good on the surface, then lowered away from the upper perimeter to be placed in proximity to the surface, thereby forming the chamber. The apparatus may also include an intermediate support structure for providing support to the canopy.

DETAILED DESCRIPTION OF THE PREFERRED EMBODIMENT

Figure 1:
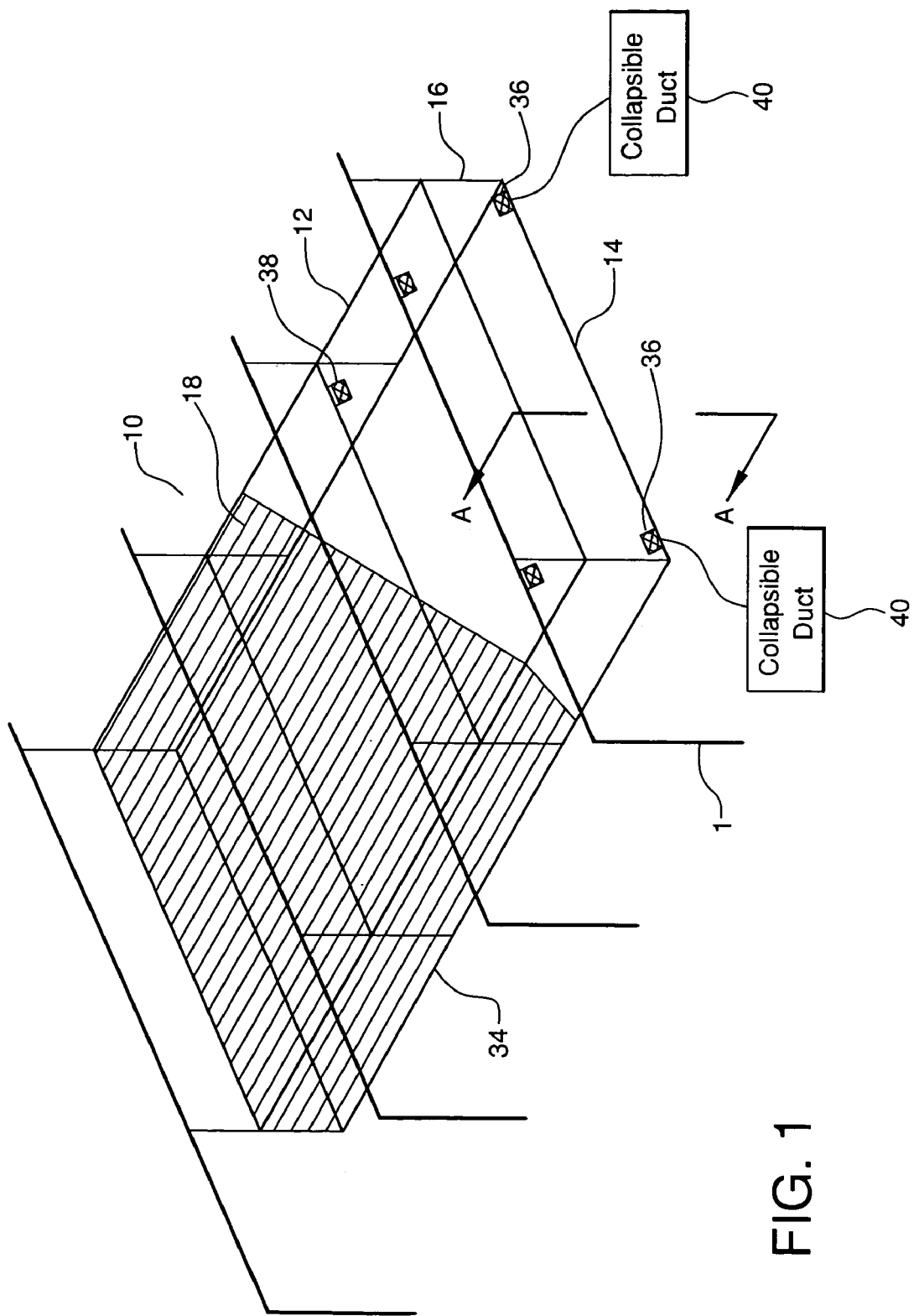
FIG. 1 is a perspective drawing of a preferred embodiment of the enclosure of the present invention.

The present invention will be understood more fully from the detailed description given below and from the accompanying drawings of preferred embodiments of the invention, which, however, should not be taken to limit the invention to a specific embodiment, but are for explanation and understanding only.

An apparatus of the present invention is used to fumigate produce, including fruit; although it should be understood that the invention includes apparatus for treatment of any good, such as foods, live munitions, grain, vehicles and paper records in which a substantially sealed chamber is desired. Treatment includes, for example, fumigating, cooling and heating. The present invention has great advantages over the prior art, in that it includes a more effective mechanism for forming a substantially sealed chamber for treating goods. Preferably, goods are treated with a flowable material, such as a gas, liquid, or combination thereof. In a preferred embodiment, the flowable material is methyl bromide gas. Advantages of a sealing mechanism of the invention over prior art systems include: (1) a safer work environment due to the reduction of the risk of methyl bromide gas leakage; (2) the ability to use less methyl bromide gas to treat the product; (3) the ability to quickly set up and complete the fumigation process, thereby minimizing the effect of delays on the ripening of the produce; (4) the ability to use the time saved and manpower previously needed to set up a fumigation process to unload the cargo from the ships; and (5) the ability to construct larger fumigation chambers in which larger amounts of product can be treated during a single fumigation event.

Acceptable levels of methyl bromide leakage in prior art fumigation systems using sand snakes approach 50% during the period of fumigation. In a preferred embodiment of the invention, methyl bromide leakage is substantially about 5% or less. This substantial reduction in methyl bromide leakage provides a safer working environment, since methyl bromide is classified as a hazardous substance, and allows fumigators to use less methyl bromide gas during the fumigation process. Reducing the amount of methyl bromide results in considerable cost savings.

The use of less methyl bromide gas to treat fruit has at least three additional significant advantages: (1) it is inherently safer to reduce the amount of hazardous gas used; (2) methyl bromide is considered an ozone-depleting substance; thus it benefits the environment to reduce its use since after the fumigation process, methyl bromide is typically not recaptured, but vented to the atmosphere; and (3) exposure of fruit to methyl bromide, despite its ability to safely kill pests, causes "blotchy," or irregular, patterns of ripening; thus any decrease in the amount of methyl bromide needed for proper fumigation will benefit the condition of the commodity.

Additionally, the need to reduce the time to set up the fumigation process is a long-felt need in the fumigation art. In an embodiment of the invention, the canopy with the seal can be lowered over the commodity in a matter of a few minutes, and the apparatus seals itself to the floor. Thus, the time and labor required to seal the tarp with sand snakes in prior art systems is substantially reduced, if not completely eliminated. A canopy of the present invention may be suspended from the ceiling of a warehouse and lowered to create the sealed fumigation chamber. In some prior art systems, framing must be erected and a tarpaulin stretched over it. That plus the use of sand snakes takes considerably more time than simply lowering a canopy that seals itself to the floor.

The time saved in setting up the fumigation process is also critical to maintaining the quality of the fruit being treated. Perishable fruit has a limited commercial life, as it is constantly maturing, ripening and, in fact, decaying at every step in the journey from harvest to market. There is a substantial commercial need to move the product through the importation process and deliver it to market as quickly as possible. For example, for every day of delay in getting fresh fruit to market, a case of highly perishable fruit can lose approximately 10% of its value. A ship can deliver for fumigation up to 700,000 cases of fruit at a time. Thus, every day of delay can effect a $700,000 loss in value due to loss of quality, in addition to the tangible expenses of rent for storage, added transportation costs, etc. An apparatus of the present invention greatly increases the storage life and shelf life of the shipped produce by reducing the time previously required to set up, treat, and deliver the produce to market.

In the same vein, the chamber formed by an apparatus of the invention may be constructed to be larger than prior art systems to treat more fruit during a single fumigation event. The USDA Treatment Manual permits fumigation enclosures to be used without specific USDA approval if they do not exceed 25,000 cubic feet in size. This value is based (at least in part) on typical levels of methyl bromide leakage using prior art systems such as the sand snake method. Due to the significant reduction in the methyl bromide leakage afforded by the present invention, an apparatus of the current invention can approach 138,000 cubic feet and be well within the methyl bromide safety requirements set forth by the USDA.

Larger fumigations would be more efficient and would use proportionately less methyl bromide. This is because the Treatment Manual prescribes the amount of space that must be left around all sides of the stacked commodity, and the same perimeter dimensions apply regardless of the volume of the stacked commodity being fumigated. Methyl bromide fills the space occupied by the commodity as well as the perimeter. The perimeter volume, therefore, becomes a smaller percentage of the total volume treated with the fumigant as the volume of the commodity increases; thereby making larger fumigations more efficient than those supplied by prior art systems.

The structure and use of the present invention are discussed in more detail below.

As shown in FIG. 1, a warehouse or other storage area will typically have a Support Structure 1, such as overhead or lateral support beams or a similar framing which supports the wall and/or ceiling over the open floor surface where goods, such as fruits and produce, are to be stored or treated. In a preferred embodiment of the present invention, the Enclosure 10 will include Upper Perimeter 12 and Lower Perimeter 14, which form the primary framing for Enclosure 10. Upper Perimeter 12 and Lower Perimeter 14 may comprise any number of structural components well known to those of skill in the art, such as a tubular steel or aluminum truss, and are not particularly limited.

Figure 2:
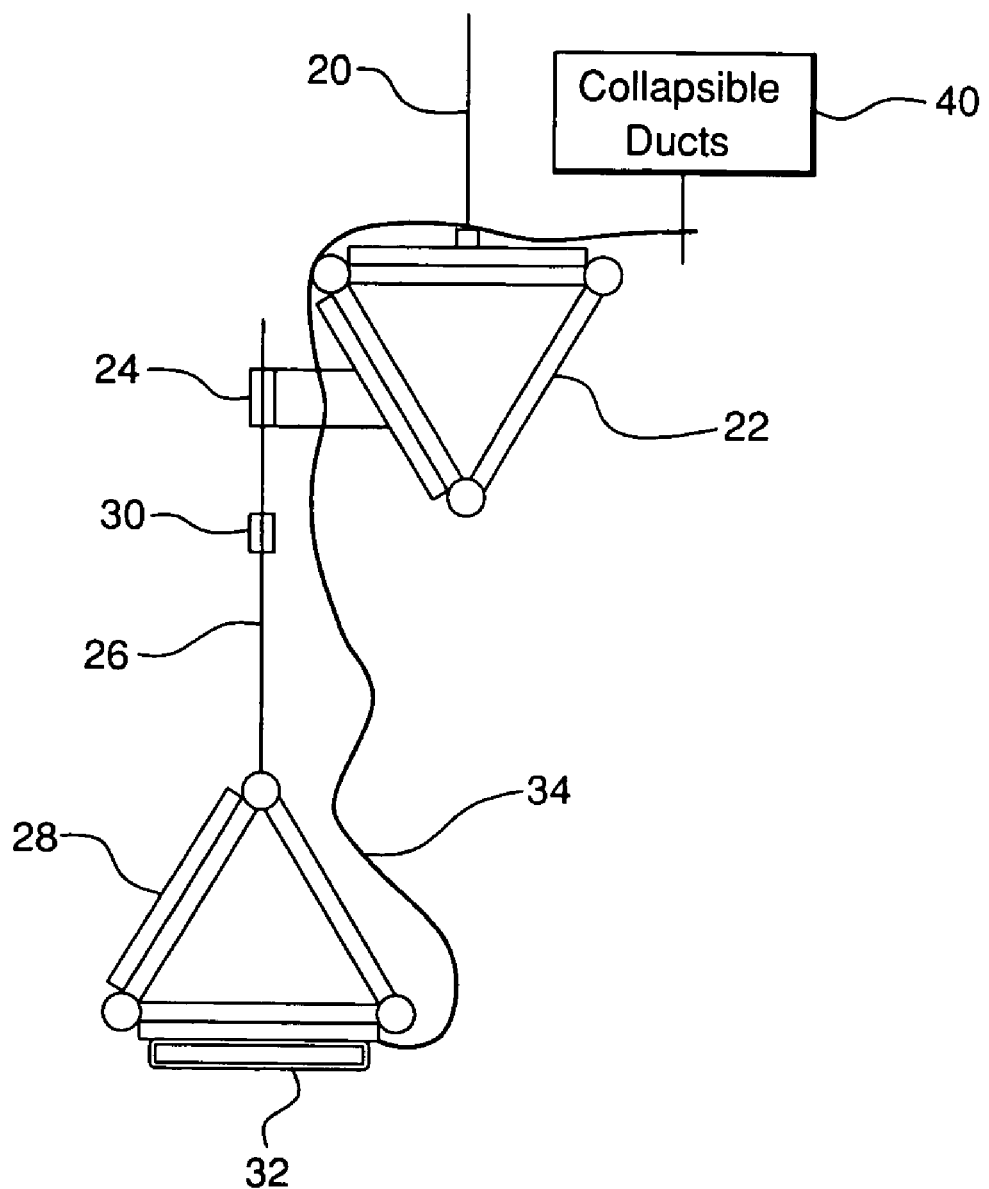
FIG. 2 is an exploded view along line A-A of FIG. 1.

Upper Perimeter 12 and Lower Perimeter 14 are preferably affixed to Support Structure 1 via Perimeter Support 16, which in a preferred embodiment of the invention comprises at least one support chain attached to each of Upper Perimeter 12 and Lower Perimeter 14, as discussed in more detail in regard to FIG. 2. It will be appreciated, however, that Perimeter Support 16 is not particularly limited, and may comprise any material capable of supporting the Upper Perimeter 12 and Lower Perimeter 14 from the Support Structure 1, such as, for example, a hoist comprising a rope, metal tubing, wire, cable or any combination thereof. Upper Perimeter 12 and Lower Perimeter 14 are preferably comprised of triangular aluminum trusses, which are shown in more detail in FIG. 2.

Further support for the Enclosure 10 may be obtained by including Intermediate Support 18, which is preferably comprised of a wire mesh or similar material, but is not limited thereto. Intermediate Support 18, in conjunction with Upper Perimeter 12 and Lower Perimeter 14 form a support structure for a canopy or tarp, as discussed in more detail now in regard to FIG. 2.

FIG. 2 is an exploded view along line A-A of FIG. 1. As shown in FIG. 2, in one preferred embodiment of the invention Perimeter Support 16 comprises an Upper Support Chain 20 and a Lower Support Chain 26. Upper Support Chain 20 is used to suspend Upper Truss 22 from the building support beams, and forms the upper perimeter of the Enclosure 10. Chain Guide 24, attached to Upper Truss 22, may be used to guide Lower Support Chain 26, which is used to suspend Lower Truss 28 from Support Structure 1. Lower Truss 28 forms Lower Perimeter 14 of Enclosure 10, which will be in proximity to the floor surface of the storage area when Enclosure 10 is lowered to form the sealed chamber. Stop Block 30 may also be included on Lower Support Chain 26 to limit the movement of Upper Truss 22 and Lower Truss 28 in relation to each other. Although this embodiment describes certain structural components to raise and lower Enclosure 10, it should be understood that the invention contemplates any mechanical, electromechanical, or air-powered system known in the art for raising and lowering a structure, such as a manual pulley system, an electrically powered motor system, a pneumatic system, or any combination thereof.

A Gasket 32 is preferably attached to the lower portion of Lower Truss 28. Gasket 32 is preferably flexible in nature, and can be comprised of any number of materials such as, for example, hollow rubber, plastic tubing, a laminated casing filled with compressible material (such as closed cell foam, polystyrene or the like), or plastic foam. The specific construction of Gasket 32 is not particularly limited so long as it is capable of being compressed against the surface of the storage area by the lower perimeter of the Enclosure 10 to form a substantially impermeable gas seal. One particularly advantageous material that may also be used for the Gasket 32 is a solvent dispersed synthetic rubber resin adhesive. An example of such material is "520 adhesive" produced by Armstrong World Industries. Another example of such material is Armaflex.

The use of a gasket provides a significant advantage over the prior art; that is, minimal labor is needed to seal the Enclosure 10 around the goods, since workers are not needed to manually manipulate heavy and cumbersome sand snakes or fill water tubes. The compressed gasket also forms a more uniform and tighter seal than weighing down a canopy with sand snakes, and thus provides a much more impermeable seal.

Canopy 34 may be attached to Lower Truss 28, extending up and over Upper Truss 22. In a preferred embodiment, one side of Canopy 34 is attached to the lower portion of Lower Truss 28 with an adhesive, and Gasket 32 is attached to another side of Canopy 34 with an adhesive; the Canopy 34 being firmly situated between Gasket 32 and the lower portion of Lower Truss 28. Canopy 34 is preferably a tarp or cover comprised of a substantially gas impermeable material, such as polyethylene. In a preferred embodiment of the invention, Canopy 34 is comprised of a material having a melting point safely below the trigger temperature for a typical warehouse sprinkler system.

Figure 6:
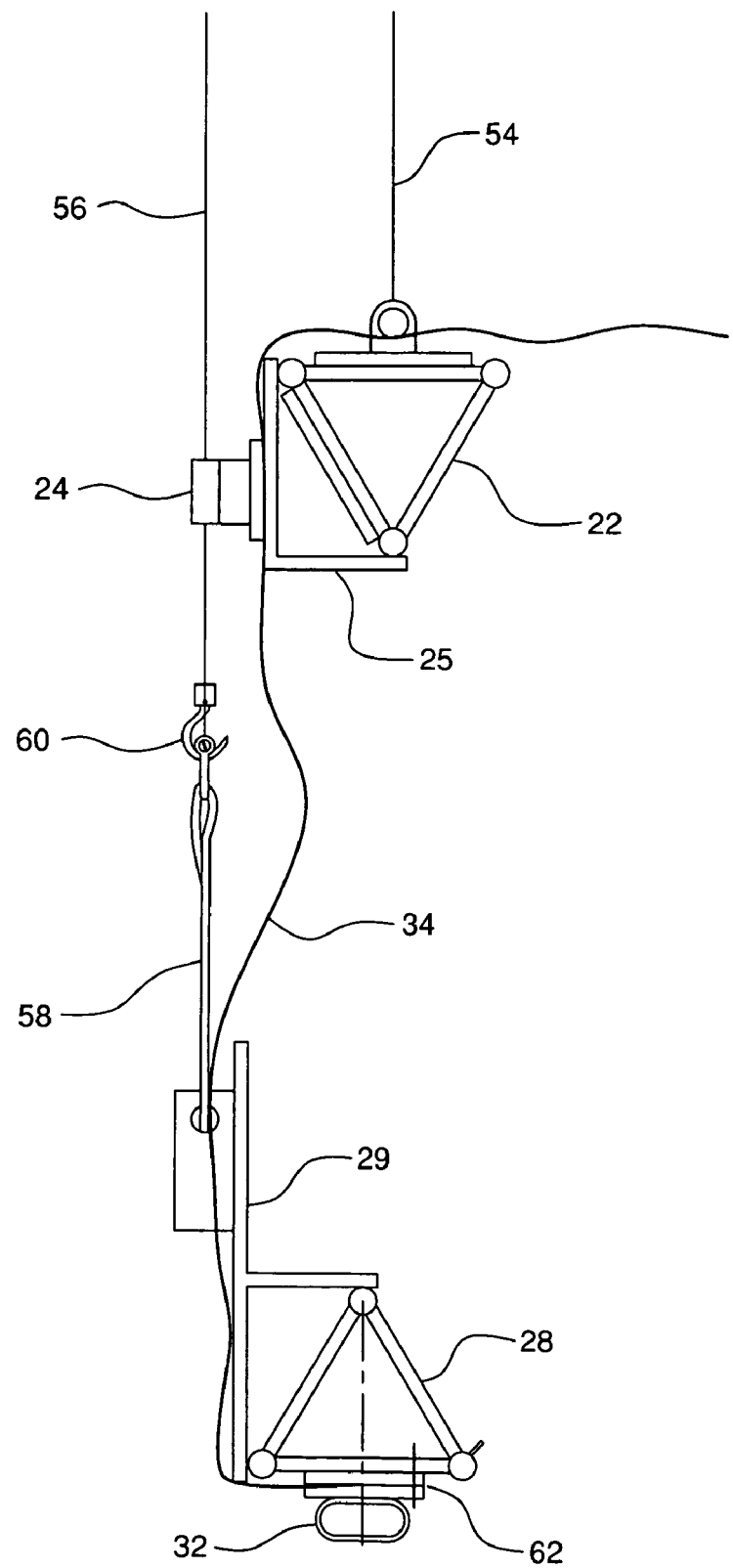
FIG. 6 is an exploded view of an embodiment of the view along line A-A of FIG. 1.

FIG. 6 is an exploded view of another embodiment of the invention along line A-A of FIG. 1. As shown in FIG. 2, in one preferred embodiment of the invention Perimeter Support 16 comprises a Static Cable 54, an Active Cable 56, and a Nylon Sling 58 removeably attached via a Hook and Shackle 60 to the Active Cable 56. Static Cable 54 is used to suspend Upper Truss 22 from the building support beams, and forms the upper perimeter of the Enclosure 10. Chain Guide 24, attached to Upper Truss 22 via Upper Truss Bracket 25, may be used to guide Active Cable 56, which is used in combination with Nylon Sling 58 to suspend Lower Truss 28 from Support Structure 1. In the embodiment shown in FIG. 6, Nylon Sling 58 is attached to Lower Truss 28 via Lower Truss Bracket 29. Lower Truss 28 forms Lower Perimeter 14 of Enclosure 10, which will be in proximity to the floor surface of the storage area when Enclosure 10 is lowered to form the sealed chamber.

Figure 7:
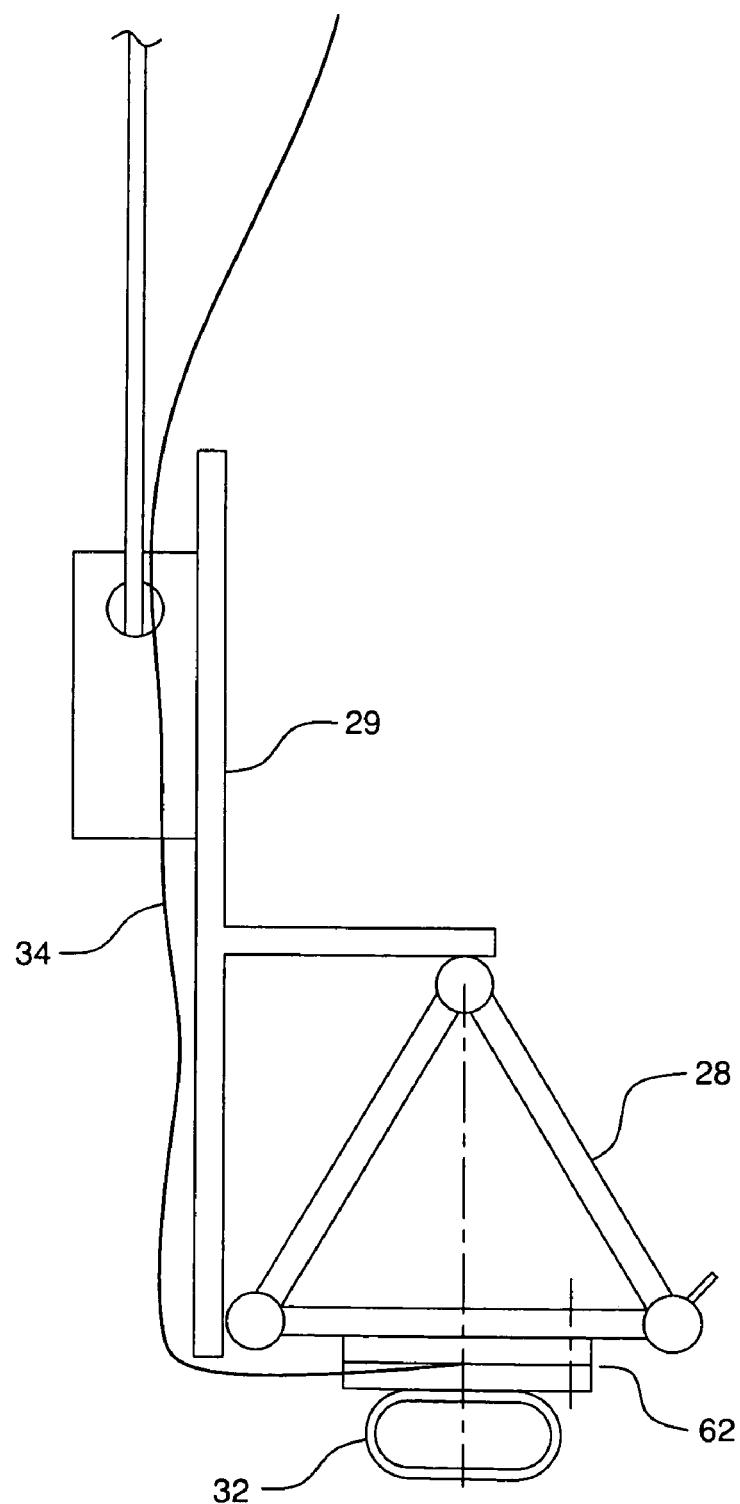
FIG. 7 is a sectional view of an embodiment of the invention shown in FIG. 6 showing a pair of substantially parallel plates for securing the canopy, the plates situated between a lower truss and a gasket.

Also in the embodiment shown in FIG. 6 (and in more detail as shown in FIG. 7), Gasket 32 may be attached to the lower portion of Lower Truss 28 via two substantially parallel Plates 62, preferably made of aluminum. In this embodiment, Canopy 34 is firmly situated between Plates 62 substantially along the length of the Lower Perimeter 14. Gasket 32 is attached below Canopy 34 to at least one of Plates 62, preferably with an adhesive.

It will be appreciated that Upper Truss 22 and Lower Truss 28 may comprise any number of materials known to those of skill in the art, such as, for example, steel, aluminum, plastic or fiberglass, and is not particularly limited in shape, so long as it is capable of adequately supporting Canopy 34. These upper and lower trusses may also include electrical conduit so that the entire Enclosure 10 can be fitted with gas, fan, and temperature probes, or other electronic devices to be used during the treatment process. These probes (not shown) can be bundled in modular units in each segment of the Enclosure 10 to avoid blocked lines or confusion in identifying specific lines.

Vent Fans 36, in communication with an area outside of Enclosure 10 (as shown in FIG. 1), may also be included in the present invention for venting a flowable material, such as gas or chilled air, in accordance with an embodiment of the invention. Vent Fans 36 preferably extend through Canopy 34 and are sealed thereto. Circulation Fans 38 may also be included within Enclosure 10 to circulate gas within Enclosure 10, typically during the treatment process. Vent Fans 36 and Circulation Fans 38 may be attached to and supported by Upper Perimeter 12, Lower Perimeter 14, or any other part of Enclosure 10 capable of supporting the weight of the fans. In one embodiment, cooling air is introduced into Enclosure 10 while methyl bromide gas is evacuated through Vent Fans 36.

A system of the present invention may preferably be operated as follows. Once Enclosure 10 is in place and a substantially sealed chamber has been created, the chamber can be filled with a flowable material, such as methyl bromide gas, to treat the goods. The gas is preferably introduced to the chamber via a flowable material supply, such as a gas supply, in communication with bulkhead fittings attached to Enclosure 10. The gas is circulated within Enclosure 10 via Circulation Fans 38 in a conventional manner for treating goods, such as fumigating fruit. In one embodiment, when the gas probes indicate that a sufficient amount of gas is present, the gas supply is turned off and the goods are treated.

After treatment is completed, Collapsible Ducts 40, preferably attached to a top portion of Canopy 34, may be opened to evacuate the gas from the chamber. However, it should be understood that ducts are optionally but not necessarily used to evacuate the gas. In another embodiment, Collapsible Ducts 40 may be attached to Vent Fans 36 to evacuate the gas from the chamber. However, it should be understood that ducts are optionally but not necessarily used to evacuate the gas. Once the volume of the gas reaches a safe level, for example 5 ppm, treatment is complete. In a preferred embodiment, the method relates to treating produce, and in such embodiment, Enclosure 10 may then be used to re-cool the produce to a desired pulp temperature without the need to move the produce to a separate location for cooling. However, it should be understood that a method and apparatus of the present invention contemplate the re-cooling of produce without any other treatment.

Creating a negative pressure begins the re-cooling portion of the present invention. Vent Fans 36 can be used to create a negative pressure on the Enclosure 10. Preferably, the negative pressure is slightly below atmospheric pressure. For example, the pressure may be one to three tenths of an inch of water below atmospheric pressure, as typically measured with a magnahelic gauge. Greater negative pressures are desirable and are also contemplated by this invention. Creating a slight negative pressure around produce will establish a pressure gradient between the internal atmosphere of the produce and its surrounding environment. This gradient increases the rate of diffusion of water vapor from the produce into the chamber. Increasing the rate of diffusion of water vapor releases more heat from the produce into the chamber, since the water vapor contains heat energy.

Next, chilled air is permitted to enter the chamber to reduce the negative pressure toward equilibrium to, for example, reestablish equilibrium or create a positive pressure. However, it should be understood that reestablishing equilibrium or creating a positive pressure are examples and are not necessarily required by this step. This air preferably has a humidity level above about 50% and most preferably above about 90%. When the pressure is changed with the introduction of chilled air, the chilled air rapidly absorbs heat energy that was released during the negative pressure cycle. In one embodiment, the steps of creating a slight negative pressure and introducing chilled air are repeated in pulses of various durations of negative and positive pressure to achieve a maximum cooling rate of the produce. In another embodiment, a slight negative pressure is maintained in the chamber after the chilled air is permitted to enter the chamber. Sensing equipment and electronic relays may be used in conjunction with vents to control the level of pressure within the chamber.

Figure 3:
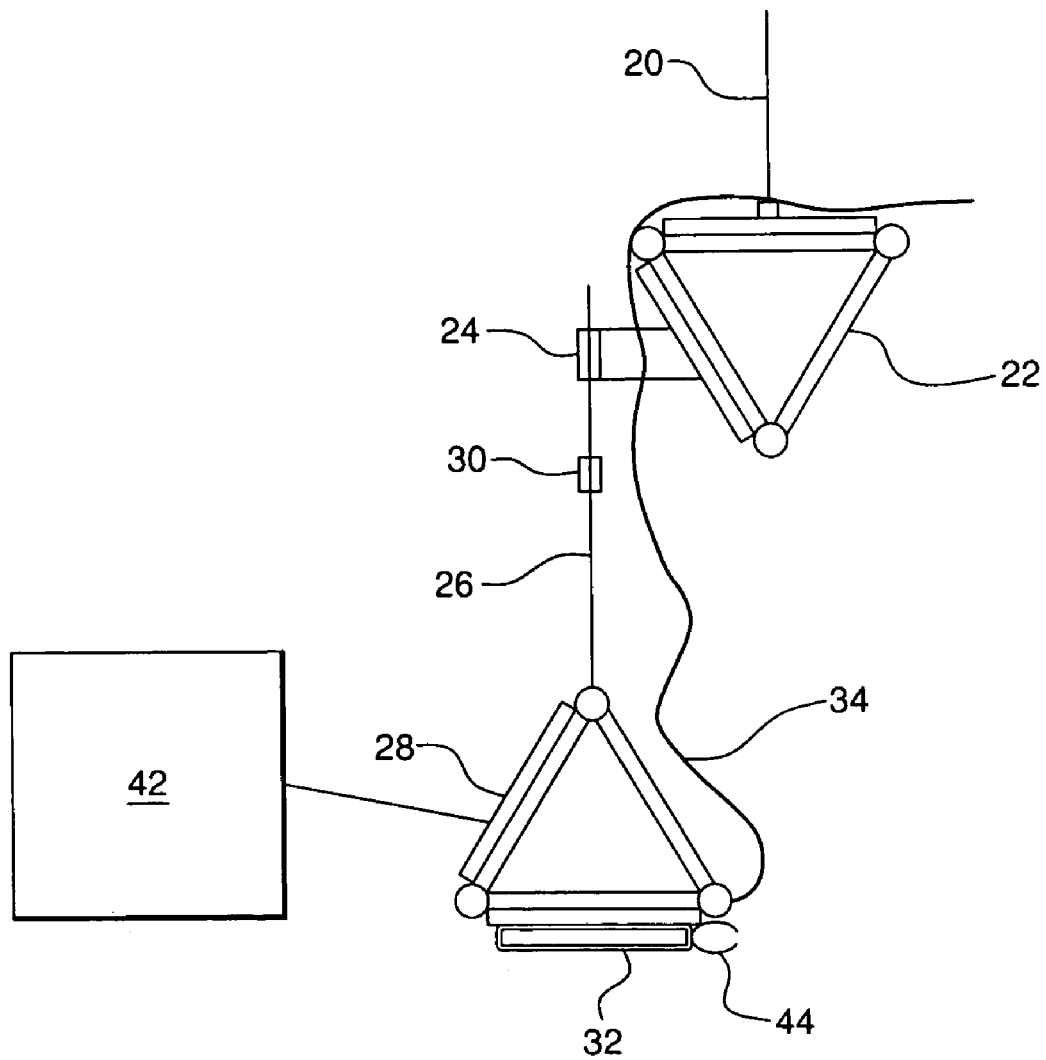
FIG. 3 is a partial view of an embodiment of the invention showing a chiller and perforated tube.
Figure 4:
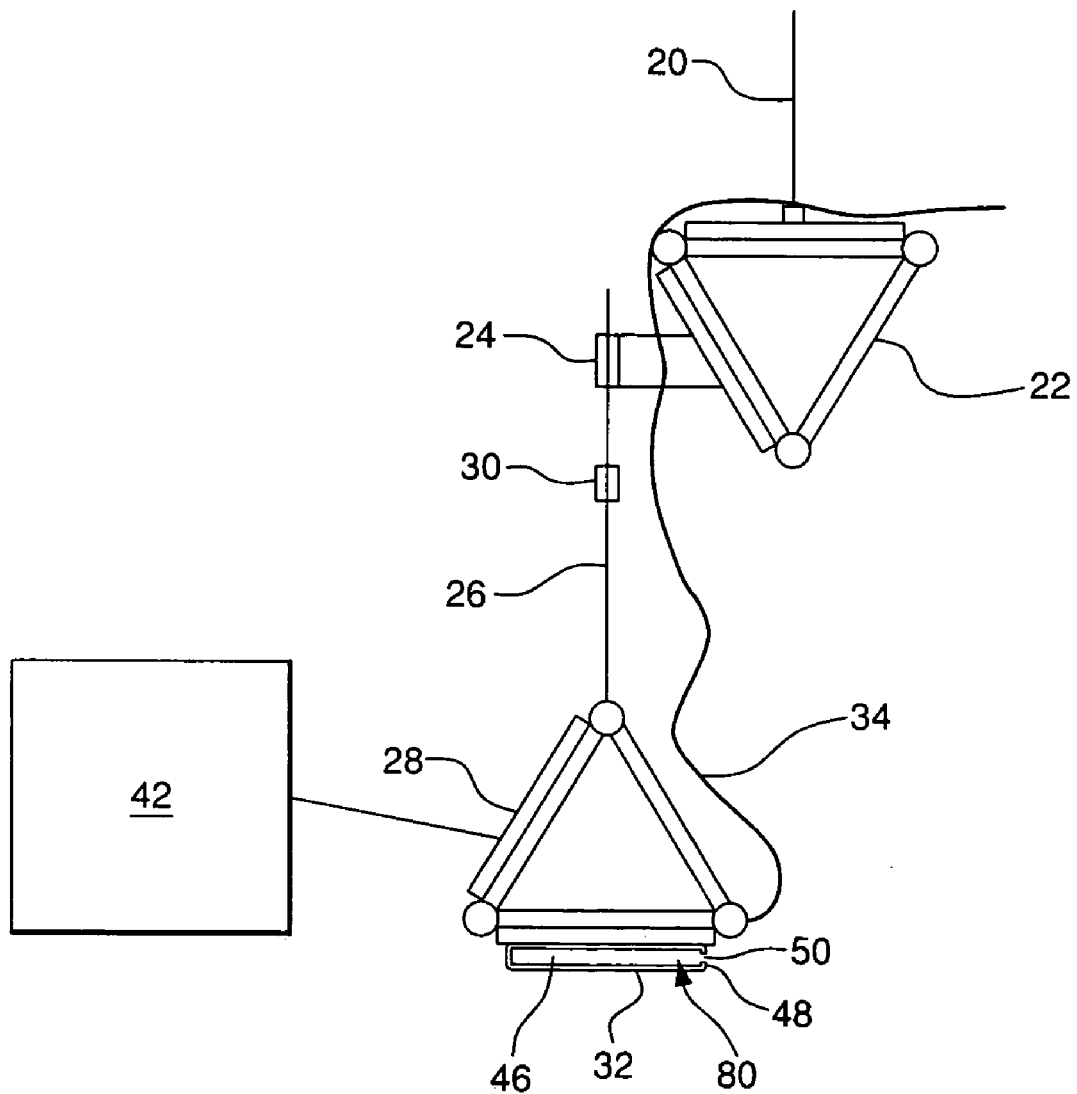
FIG. 4 is a partial view of an embodiment of the invention showing a hollow gasket with perforations for dispensing cool gas into the chamber.
Figure 5:
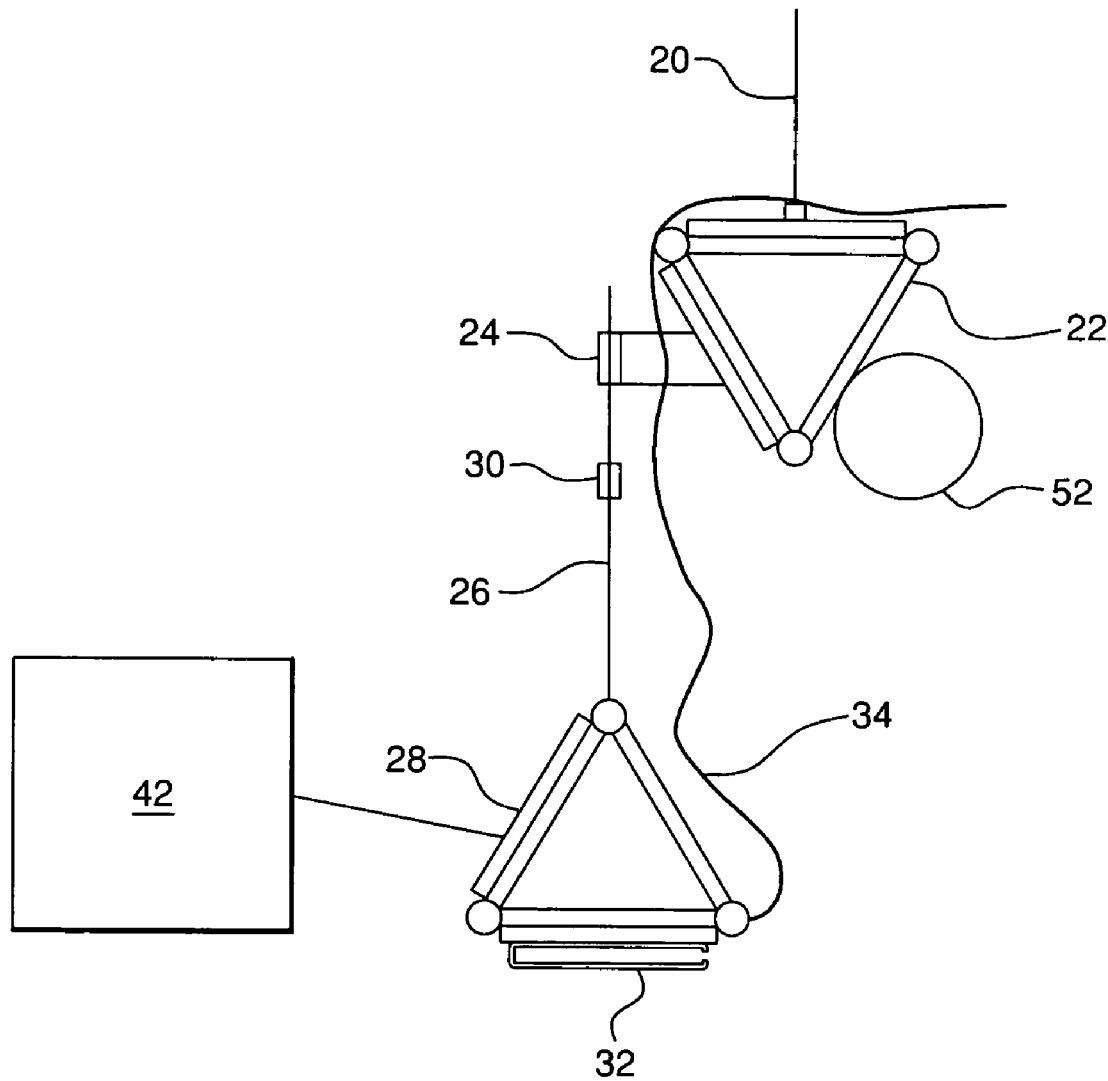
FIG. 5 is a partial view of an embodiment of the invention showing a flexible distribution conduit for leaking cool gas into the chamber.

Chilled air maybe introduced to the chamber in any number of ways. For example, as shown in FIG. 3, Chiller 42 may be used to supply the chilled air through Perforated Tubes 44 that run inside the Enclosure 10 along the Lower Perimeter 14 and/or Upper Perimeter 12. Perforated tubes 44 are an exemplary embodiment of the cooling conduit for supplying chilled air to the chamber. In another embodiment, as shown in FIG. 4, the Gasket 32 forms a Bore 46 along its length. The Chiller 42 is connected to the Gasket 32 such that chilled air is available in the Bore 46. An Inner Surface 48 of the Gasket 32 is in communication with the chamber. Cooling conduit 80 has Perforations 50 in the Inner Surface 48 communicate with the Bore 46 such that the chilled air enters the chamber via the Perforations 50. In yet another embodiment, as shown in FIG. 5, a Flexible Distribution Conduit 52, preferably comprising cloth, may be removeably attached to the Enclosure 10. Air blown through this conduit leaks into the chamber at a predetermined rate. The conduit may be attached, for example, to Upper Perimeter 12 or Lower Perimeter 14 via a hook and loop system, but the method of attachment is not particularly limited. It should be understood that other flowable materials, such as methyl bromide gas, may be introduced into the chamber according to these embodiments.

Fruits, vegetables and plants in general naturally produce ethylene, which is a regulator of growth and development. It is known that ethylene increases the speed of ripening and decay of fruit and produce. Thus, in a preferred embodiment of the invention, ethylene and warmer air are evacuated from the Enclosure 10 using Vent Fans 36 or Collapsible Ducts 40.

In tests conducted using a method of the present invention, 62,000 cases of produce were cooled from a fumigation temperature of approximately 40° F. to a storage temperature of approximately 32° F. in six hours. The corresponding cooling time using conventional methods is typically from two to seven days. Cooling the fruit using a method of the present invention provided an additional two weeks of storage life, which equates to five days of shelf life.

By re-cooling product in this manner, the present invention achieves significant advantages over the prior art in that the fruit does not have to be moved during any part of this process, which results in less damage to the fruit. This hypobaric pressure process results in faster cooling and therefore greater shelf life and storage life. By using hypobaric cooling in the manner of the present invention, there intuitively is less friction on the fruit than traditional forced-air cooling, and therefore less damage to the produce skin. Hypobaric cooling also inhibits decay and results in less water loss. Since produce is sold by weight, minimizing water loss also maximizes saleable weight, thus increasing the value of the product.

Although this invention has been described with reference to particular embodiments, it will be appreciated that many variations may be resorted to without departing from the spirit and scope of this invention.

We claim:

1. An apparatus for enclosing goods on a surface for treatment comprising:
   a canopy that is substantially impermeable to flowable materials;
   an upper perimeter for supporting an upper portion of said canopy;
   a lower perimeter for supporting a lower portion of said canopy, said lower perimeter being moveable with respect to said upper perimeter to form a chamber;
   a perimeter support for supporting said upper perimeter and lower perimeter; and
   a gasket in communication with said lower perimeter, said gasket being deformable to substantially seal the chamber by compressing said gasket against the surface and wherein the gasket has a hollow portion along its length and an inner surface in communication with the chamber, the inner surface having a plurality of perforations extending from the chamber to the hollow portion of the gasket.

2. The apparatus of claim 1 further comprising a flowable material supply in communication with the hollow portion of the gasket.

3. The apparatus of claim 1 wherein the flowable material supply is a cold air supply.

4. A method of treating goods with a flowable material comprising the steps of:
placing the goods on a surface;
providing an apparatus comprising:
a canopy that is substantially impermeable to the flowable material;
an upper perimeter for supporting an upper portion of said canopy;
a lower perimeter for supporting a lower portion of said canopy;
a perimeter support for supporting said upper perimeter and lower perimeter; and
a gasket in communication with said lower perimeter, said gasket being deformable and wherein the gasket has a hollow portion along its length and an inner surface in communication with the chamber, the inner surface having a plurality of perforations extending from the chamber to the hollow portion of the gasket,
lowering the apparatus to form a chamber over said goods on said surface;
causing the gasket to deform against said surface to substantially seal the chamber;
treating the goods comprising injecting the flowable material into the chamber wherein the step of injecting the flowable material into the chamber further comprises connecting a flowable material supply to the hollow portion of the gasket; and
venting the chamber.

5. An apparatus for enclosing goods on a surface for fumigation comprising:
a canopy that is substantially impermeable to flowable materials; an upper perimeter for supporting an upper portion of said canopy;
a lower perimeter supporting a lower portion of said canopy, said lower perimeter to be placed in proximity to said surface;
a support structure capable of supporting said upper perimeter and lower perimeters; and
a gasket in communication with said lower perimeter, wherein said gasket is capable of being compressed by said lower perimeter against said surface to form a chamber, wherein the gasket has a hollow portion along its length and an inner surface in communication with the chamber, the inner surface having a plurality of perforations extending from the chamber to the hollow portion of the gasket.

6. The apparatus of claim 5 further comprising a flowable material supply in communication with the hollow portion of the gasket.

7. The apparatus of claim 6 wherein the flowable material supply is a cold air supply.

8. An apparatus for enclosing produce on a surface for fumigation and re-cooling comprising:

a canopy that is substantially impermeable to flowable materials; an upper perimeter for supporting an upper portion of said canopy;
a lower perimeter for supporting a lower portion of said canopy, said lower perimeter being moveable with respect to said upper perimeter to form a chamber;
a perimeter support for supporting said upper perimeter and lower perimeter;
a gasket in communication with said lower perimeter, said gasket being deformable to substantially seal the chamber by compressing said gasket against the surface;
a fumigation conduit for injecting a flowable material into the chamber;
a vent to release the flowable material from the chamber;
a means for changing a pressure within the chamber; and
a cooling conduit for supplying chilled air to the chamber, wherein the cooling conduit forms a bore along the length of said gasket, the cooling conduit having an inner surface in communication with the chamber, the inner surface having a plurality of perforations extending from the chamber to the cooling conduit.

9. A method of fumigating and re-cooling produce comprising the steps of:
placing the produce on a surface;
providing an apparatus comprising:
a canopy that is substantially impermeable to flowable materials;
an upper perimeter for supporting an upper portion of said canopy;
a lower perimeter for supporting a lower portion of said canopy;
a perimeter support for supporting said upper perimeter and lower perimeter; and
a gasket in communication with said lower perimeter, said gasket being deformable;
lowering the apparatus to form a chamber over said produce on said surface;
causing the gasket to deform against said surface to substantially seal the chamber;
injecting a first flowable material into the chamber to fumigate the produce;
venting the flat flowable material from the chamber;
creating a first negative pressure within the chamber; and
supplying a second flowable material to the chamber for re-cooling the produce, wherein the second flowable material is supplied to the chamber via a cooling conduit in communication with the chamber and wherein the cooling conduit forms a bore along the length of said gasket, the cooling conduit having an inner surface in communication with the chamber, the inner surface having a plurality of perforations extending from the chamber to the cooling conduit, and the step of supplying the second flowable material further comprises connecting a chilled air supply to the cooling conduit.

* * * * *